(12) United States Patent
Masters et al.

(10) Patent No.: US 11,853,179 B1
(45) Date of Patent: *Dec. 26, 2023

(54) DETECTION OF A DMA (DIRECT MEMORY ACCESS) MEMORY ADDRESS VIOLATION WHEN TESTING PCIE DEVICES

(71) Applicant: TELEDYNE LECROY, INC., Thousand Oaks, CA (US)

(72) Inventors: Aaron Masters, Loomis, CA (US); Kevin Lemay, Loomis, CA (US); Chuck Tuffli, Loomis, CA (US)

(73) Assignee: TELEDYNE LECROY, INC., Thousand Oaks, CA (US)

( * ) Notice: Subject to any disclaimer, the term of this patent is extended or adjusted under 35 U.S.C. 154(b) by 516 days.

This patent is subject to a terminal disclaimer.

(21) Appl. No.: 16/728,338

(22) Filed: Dec. 27, 2019

Related U.S. Application Data

(60) Provisional application No. 62/785,915, filed on Dec. 28, 2018.

(51) Int. Cl.
*G06F 13/28* (2006.01)
*G06F 11/22* (2006.01)
*G06F 13/42* (2006.01)

(52) U.S. Cl.
CPC ............ *G06F 11/221* (2013.01); *G06F 13/28* (2013.01); *G06F 13/4221* (2013.01); *G06F 2213/0026* (2013.01)

(58) Field of Classification Search
CPC ........ G06F 13/00; G06F 13/221; G06F 13/28; G06F 13/4221; G06F 2213/0026
See application file for complete search history.

(56) References Cited

U.S. PATENT DOCUMENTS

| 7,222,197 | B2 * | 5/2007 | Jeddeloh | G06F 13/4009 |
| | | | | 710/28 |
| 10,896,106 | B2 * | 1/2021 | Panis | G06F 11/2236 |
| 2004/0210817 | A1 * | 10/2004 | Kapoor | G06F 21/577 |
| | | | | 714/763 |
| 2005/0015378 | A1 * | 1/2005 | Gammel | G06F 12/1009 |
| 2016/0062911 | A1 * | 3/2016 | Kegel | G06F 12/02 |
| | | | | 710/308 |

* cited by examiner

*Primary Examiner* — Henry Tsai
*Assistant Examiner* — Kim T Huynh
(74) *Attorney, Agent, or Firm* — K&L Gates LLP

(57) ABSTRACT

A method for detecting a Direct Memory Access (DMA) memory address violation when testing PCIe devices is disclosed. The method for detecting a DMA memory address violation when testing PCIe devices applies to unintentional and intentional accesses of memory space outside of an area in memory specified by the device driver developed for the device.

19 Claims, 3 Drawing Sheets

DETECTION OF A DMA (DIRECT MEMORY ACCESS) MEMORY ADDRESS VIOLATION WHEN TESTING PCIE DEVICES

CLAIM OF BENEFIT TO PRIOR APPLICATION

This application claims benefit to U.S. Provisional Patent Application 62/785,915, entitled "Detection of a DMA (Direct Memory Access) memory address violation when testing PCIe Devices," filed Dec. 28, 2018. The U.S. Provisional Patent Application 62/785,915 is incorporated herein by reference.

BACKGROUND

Embodiments of the invention described in this specification relate generally to error detection during device development and testing, and more particularly, to a method for detecting a Direct Memory Access (DMA) memory address violation when testing peripheral component interconnect express (PCIe) devices.

Development of device drivers for devices with a DMA engine is often faced with the challenge of ensuring that the device does not access memory space outside the area specified by the device driver. While such memory accesses may be unintentional, the failure to detect this possibility can be staggering. Specifically, when such a device accesses memory space outside the area specified by the device driver, functional errors are likely to occur because this type of DMA access can create an error that ranges from simple data corruption to total system failure. It is difficult, but preferable, to detect, catch, or anticipate such errors or failures in a test environment early in the development process, because these failures can be very difficult and time consuming to debug after development when the additional complexity results in problems that are almost impossible to root cause.

Another problem in the development of device drivers for devices with a DMA engine is the possibility of intentional/purposeful accesses of memory space outside of the area specified by the device driver. Such intentional/purposeful accesses of memory space outside the permitted area can arise for the purpose of system hacking, unauthorized data access, launching malware, infecting a system with a virus, logging system activities/events that are not intended to be exposed, etc. While there are many existing applications and systems that focus on DMA access restrictions, the detection of memory space accesses during the development/testing of device drivers for devices with a DMA engine does not occur in the present state of the field.

Therefore, what is needed is a way to detect a DMA memory address violation, whether unintentional or intentional, when testing PCIe devices during development.

BRIEF DESCRIPTION

A novel method for detecting a Direct Memory Access (DMA) memory address violation when testing peripheral component interconnect express (PCIe) devices is disclosed. In some embodiments, the method for detecting a DMA memory address violation when testing PCIe devices applies to unintentional and intentional accesses of memory space outside of an area in memory specified by the device driver developed for the device.

In some embodiments, the method for detecting a DMA memory address violation when testing PCIe devices comprises (I) enabling an I/O memory management unit (IOMMU), (ii) allocating a domain as a memory fence area in the IOMMU, (iii) adding a peripheral component interconnect express (PCIe) device, (iv) adding a memory address for the PCIe device, and (v) monitoring direct memory access (DMA) for any accesses to memory space outside of the memory fence area.

In some embodiments, the method for detecting a DMA memory address violation when testing PCIe devices detects, in a test environment during a device testing phase of development, functional errors that occur when a device with a DMA engine accesses memory space outside of the area specified by the device driver. In some embodiments, the method for detecting a DMA memory address violation when testing PCIe devices detects when a device with a DMA engine purposely accesses the memory space outside of the area specified by the device drive for a nefarious purpose. Examples of a nefarious purpose include, without limitation, system hacking, unauthorized data access, launching malware, infecting a system with a virus, logging or tracking system activities or events that are not intended to be exposed.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
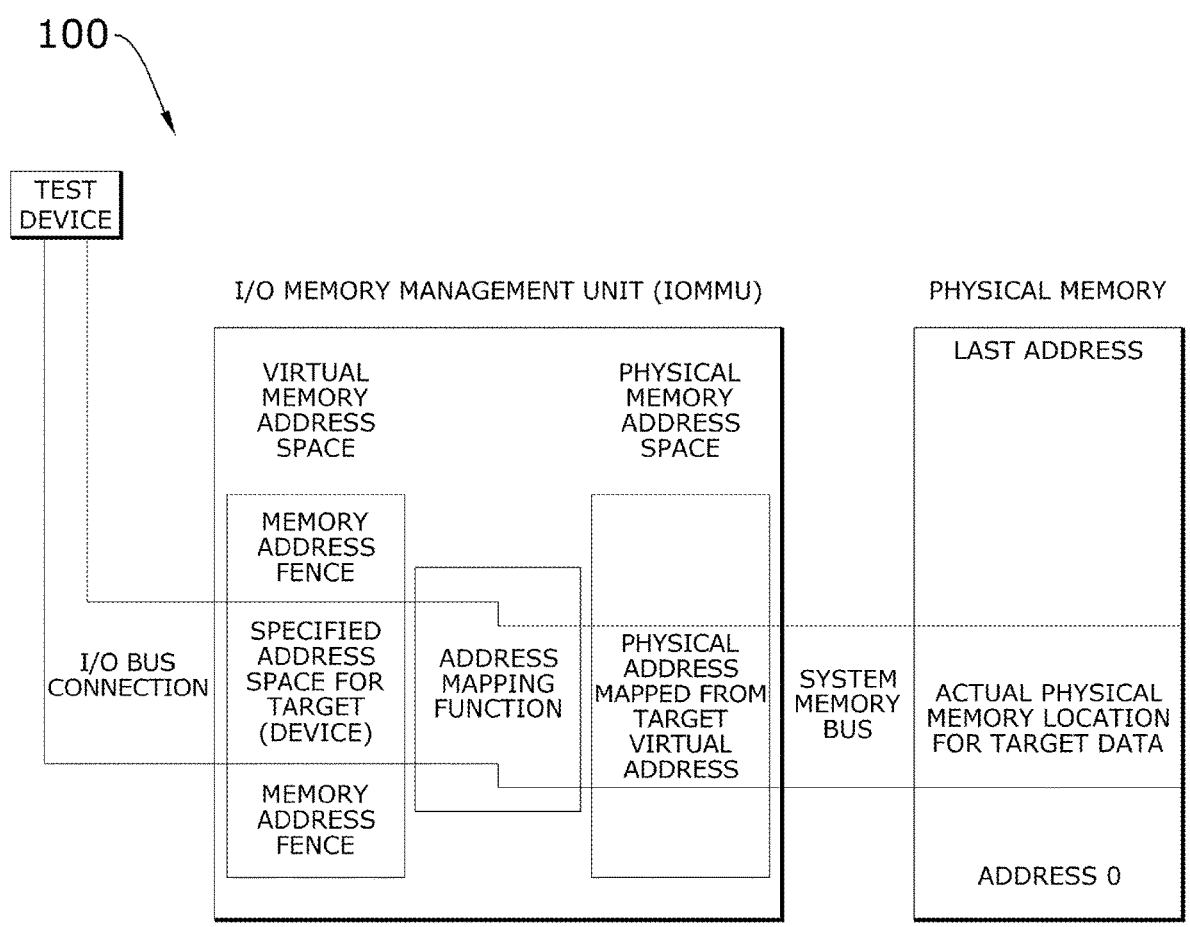
FIG. 1 conceptually illustrates a block diagram of detection of a DMA memory address violation when testing PCIe devices in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for detecting a Direct Memory Access (DMA) memory address violation when testing peripheral component interconnect express (PCIe) devices. In some embodiments, the method for detecting a DMA memory address violation when testing PCIe devices applies to unintentional and intentional accesses of memory space outside of an area in memory specified by the device driver developed for the device.

In some embodiments, the method for detecting a DMA memory address violation when testing PCIe devices comprises (I) enabling an I/O memory management unit (IOMMU), (ii) allocating a domain as a memory fence area in the IOMMU, (iii) adding a peripheral component interconnect express (PCIe) device, (iv) adding a memory address for the PCIe device, and (v) monitoring direct memory access (DMA) for any accesses to memory space outside of the memory fence area.

In some embodiments, the method for detecting a DMA memory address violation when testing PCIe devices detects, in a test environment during a device testing phase of development, functional errors that occur when a device with a DMA engine accesses memory space outside of the area specified by the device driver. In some embodiments, the method for detecting a DMA memory address violation when testing PCIe devices detects when a device with a DMA engine purposely (intentionally) accesses the memory space outside of the area specified by the device drive for a nefarious purpose. Examples of a nefarious purpose include, without limitation, system hacking, unauthorized data access, launching malware, infecting a system with a virus, logging or tracking system activities or events that are not intended to be exposed.

As stated above, there is a present need for a way to detect an intentional or unintentional DMA memory address violation when testing PCIe devices during development due to at least two known problems or issues in the field of device development/testing when a device with a DMA engine accesses memory space outside of a permitted area of memory as specified by the associated device driver. First, development of device drivers for devices with a DMA engine is often faced with the challenge of ensuring that the device does not access memory space outside the area specified by the device driver. While such memory accesses may be unintentional, the failure to detect this possibility can be staggering. Specifically, when such a device accesses memory space outside the area specified by the device driver, functional errors are likely to occur because this type of DMA access can create an error that ranges from simple data corruption to total system failure. It is difficult, but preferable, to detect, catch, or anticipate such errors or failures in a test environment early in the development process, because these failures can be very difficult and time consuming to debug after development when the additional complexity results in problems that are almost impossible to root cause. The second problem in the development of device drivers for devices with a DMA engine is the possibility of intentional/purposeful accesses of memory space outside of the area specified by the device driver. Such intentional/purposeful accesses of memory space outside the permitted area can arise for the purpose of system hacking, unauthorized data access, launching malware, infecting a system with a virus, logging system activities/events that are not intended to be exposed, etc. While there are many existing applications and systems that focus on DMA access restrictions, the detection of memory space accesses during the development/testing of device drivers for devices with a DMA engine does not occur in the present state of the field. Embodiments of the method for detecting a DMA memory address violation when testing PCIe devices of the present disclosures addresses these issues and solves these problems by enabling the I/O Memory Management Unit (IOMMU) to re-map physical memory addresses to virtual addresses. Typically, the IOMMU is disabled unless a virtual machine software is installed and running. Once the virtual address is established for a given device, any DMA (memory access) outside the virtual address space by the device causes a memory access error and be flagged.

Embodiments of the method for detecting a DMA memory address violation when testing PCIe devices described in this specification differ from and improve upon currently existing options. In particular, some embodiments differ by providing the ability to set memory address range access detection areas (memory fences/barriers) for the purpose of error detection or security in either a production or a test environment. In contrast, the existing applications and systems that focus on DMA access restrictions do not provide anything like the method for detecting a DMA memory address violation when testing PCIe devices— specifically, in making it possible to set memory address range access detection areas (fences/barriers) for the purpose of error detection or security (regardless of whether in production environment or in test environment).

The method for detecting a DMA memory address violation when testing PCIe devices of the present disclosure may be comprised of the following elements. This list of possible constituent elements is intended to be exemplary only and it is not intended that this list be used to limit the method for detecting a DMA memory address violation when testing PCIe devices of the present application to just these elements. Persons having ordinary skill in the art relevant to the present disclosure may understand there to be equivalent elements that may be substituted within the present disclosure without changing the essential function or operation of the method for detecting a DMA memory address violation when testing PCIe devices.

1. Enable the I/O Memory Management Unit (IOMMU)
2. Allocate domain (also referred to as a "fence area" or "memory fence area")
3. Add PCIe device
4. Add memory address for PCIe device
5. Monitor direct memory access (DMA) for any accesses to memory space outside of the memory fence area The method for detecting a DMA memory address violation when testing PCIe devices of the present disclosure generally works by implementation of the method for detecting a DMA memory address violation when testing PCIe devices, which includes enabling the IOMMU (I/O Memory Management Unit), and then using the IOMMU to re-map physical memory addresses to virtual addresses. By way of example, FIG. 1 conceptually illustrates a block diagram 100 in which IOMMU is enabled and used to re-map physical memory addresses to virtual addresses. Specifically, FIG. 1 highlights mapping and fencing of virtual memory to physical memory over a PCIe bus and a system memory bus. When a target device accesses a memory address that is outside of the memory address fence, an error will be generated and a test engineer will receive a notification from an application that implements the method for detecting a DMA memory address violation when testing PCIe devices (e.g., an application with a graphical user interface (GUI)) and the error will be logged in a test log.

Typically, the IOMMU is disabled unless a virtual machine software program is installed and running. Once the virtual address is established for a given device, any DMA (memory access) outside the virtual address space by the device will cause a memory access error. By flagging these errors and then correlating them to the device, the user can be notified that the device is attempting to access memory beyond the space allocated for that specific device.

While this idea is used in virtual machine applications and systems, the improvements to these features as intended for detection of unpermitted memory accesses by a device therefore provides a new way to find memory excursions on storage devices either under test or in a production system that use the PCIe interface.

Figure 2:
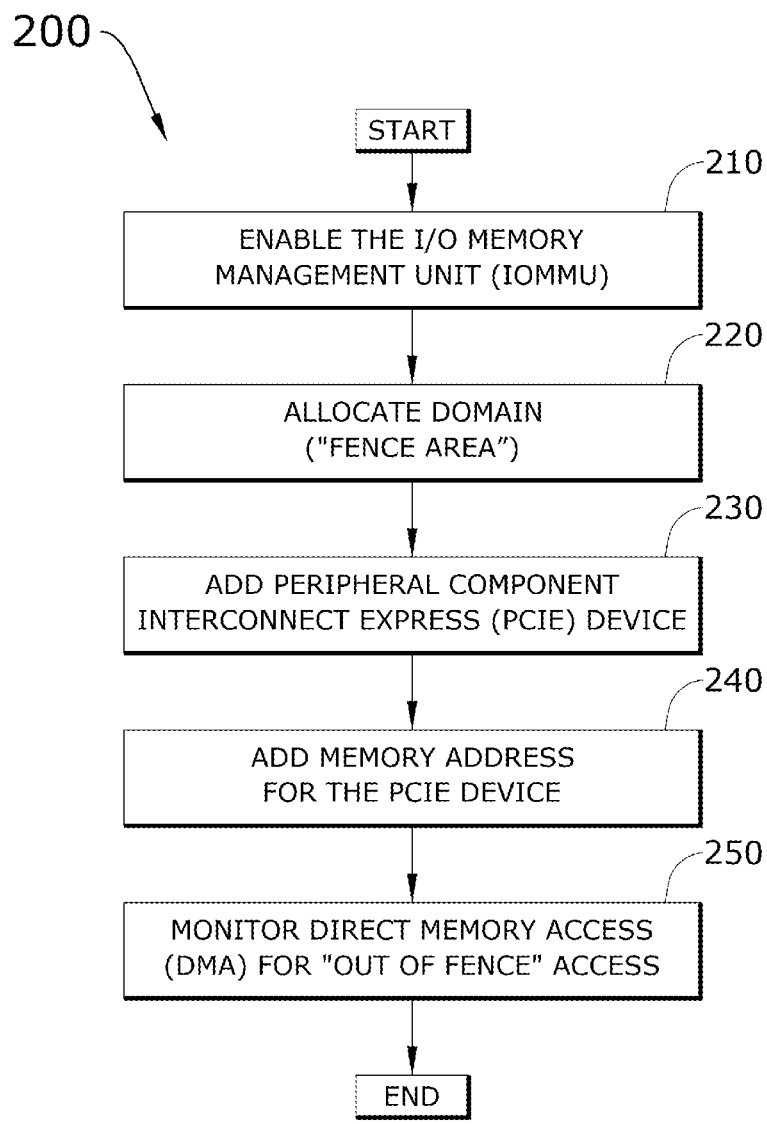
FIG. 2 conceptually illustrates a method for detecting a Direct Memory Access (DMA) memory address violation when testing PCIe devices in some embodiments.

By way of example, FIG. 2 conceptually illustrates a method for detecting a Direct Memory Access (DMA) memory address violation when testing PCIe devices 200. As shown in this figure, the method for detecting a Direct Memory Access (DMA) memory address violation when testing PCIe devices 200 starts by enabling (at 210) the I/O memory management unit (IOMMU). Next, the method for detecting a Direct Memory Access (DMA) memory address violation when testing PCIe devices 200 allocates (at 220) the domain (or rather, the "fence area"). After enabling the IOMMU and allocating the domain, the method for detecting a Direct Memory Access (DMA) memory address violation when testing PCIe devices 200 of some embodiments adds (at 230) a peripheral component interconnect express (PCIe) device. The method for detecting a Direct Memory Access (DMA) memory address violation when testing PCIe devices 200 then adds (at 240) a memory address for the PCIe device. Finally, the method for detecting a Direct Memory Access (DMA) memory address violation when testing PCIe devices 200 monitors (at 250) direct memory access (DMA) for accesses to memory space that are outside of the fence area. In some embodiments, the method for detecting a Direct Memory Access (DMA) memory address violation when testing PCIe devices 200 performs the monitoring (at 250) repeatedly until intentionally ended.

Essentially, the method for detecting a Direct Memory Access (DMA) memory address violation when testing PCIe devices 200 shown in FIG. 2 just allocates the domain and the PCIe device and the memory addresses for the devices are then added. The method for detecting a Direct Memory Access (DMA) memory address violation when testing PCIe devices 200 also monitors the memory accesses of the device and when a memory address outside of the memory address fence is detected, an error is generated and a test engineer will receive the error notification from the graphical user interface (GUI) of the kernel configuration module or program and the error will be logged in a test log.

To make the method for detecting a DMA memory address violation when testing PCIe devices of the present disclosure, one may implement the method for detecting a DMA memory address violation when testing PCIe devices by a program module. Specifically, the method for detecting a DMA memory address violation when testing PCIe devices can be implemented as a set of system commands in a kernel configuration module (such as a proprietary kernel configuration module known by the name "OakGate Kernel Configuration Module") which includes sets of computer instructions, electronic system instructions, and/or machine-readable instructions for enabling the IOMMU and configuring the IOMMU to create virtual addresses for specific devices on the PCIe backplane.

As indicated above, once the virtual memory space is defined and enabled, any memory accesses a device makes outside that specified virtual memory space triggers an error message that will be displayed to the user and/or the test will fail. In some embodiments, the method for detecting a DMA memory address violation when testing PCIe devices, when implemented as the kernel configuration module, detects and categorizes these errors, and then presents them to the user indicating the device and its operation that caused the error and any addresses accessed outside the specified memory space.

To use the method for detecting a Direct Memory Access (DMA) memory address violation when testing PCIe devices of the present disclosure, one may start with a kernel configuration module (implementation of the method for detecting a Direct Memory Access (DMA) memory address violation when testing PCIe devices) that is deployed in a test system or test environment, such as an OakGate test system. Although usage of the kernel configuration module (implementation of the method for detecting a Direct Memory Access (DMA) memory address violation when testing PCIe devices) is possible with an OakGate test system, the method for detecting a Direct Memory Access (DMA) memory address violation when testing PCIe devices 200 and usage of a kernel configuration module is not limited to only an OakGate test system. A person of relevant skill in the art would appreciate that there are alternatives to using an OakGate test system. However, the implementation of the method for detecting a Direct Memory Access (DMA) memory address violation when testing PCIe devices within the OakGate test system allows for a simple "enable memory fencing option" selection. Once the option to enable memory fencing is selected, all memory accesses by the device under test are checked against what has been specified for that device. If the device under test attempts a memory access outside the specified address space, an error is flagged and logged.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "program", "application", "module", and "kernel configuration module" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
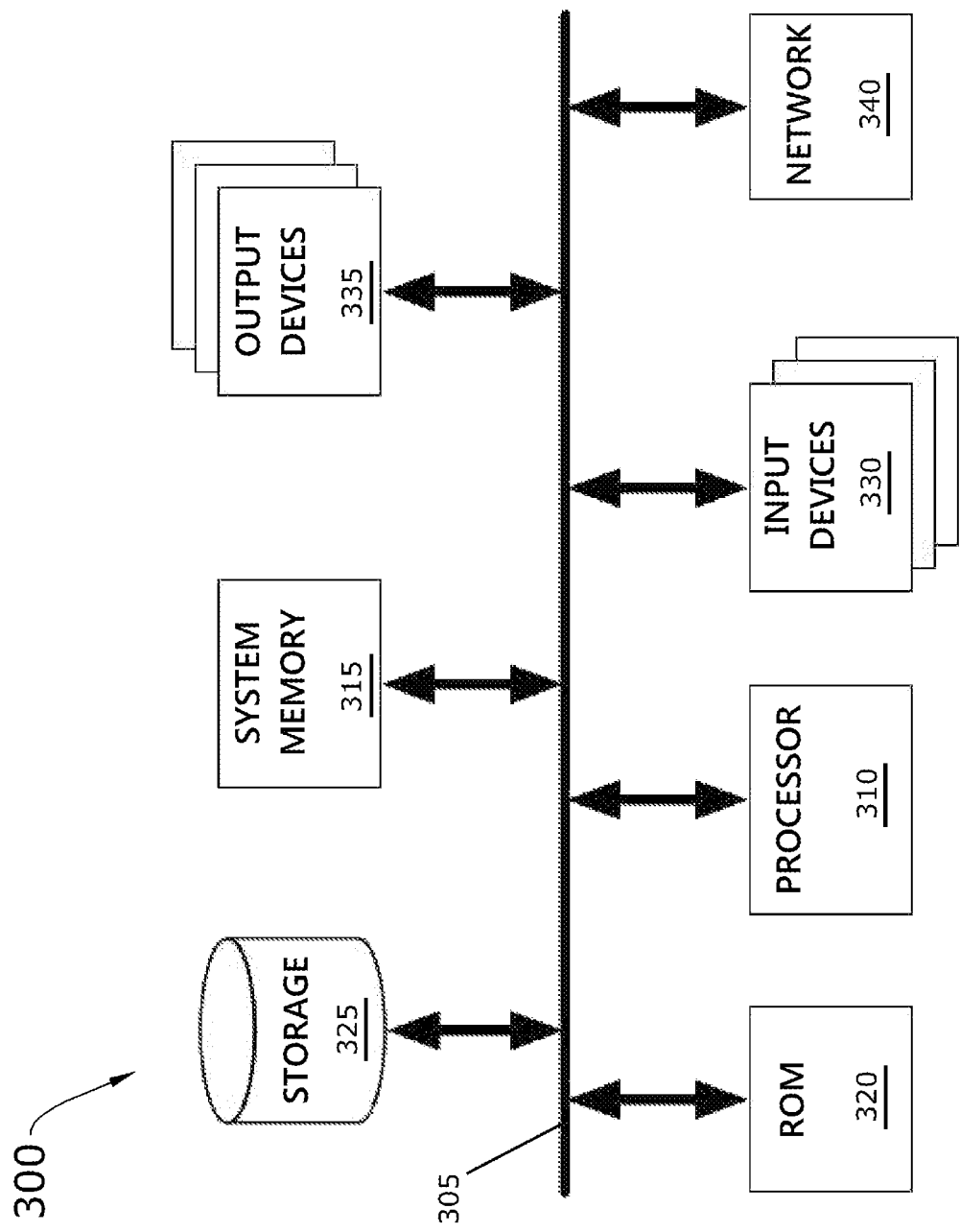
FIG. 3 conceptually illustrates an electronic system with which some embodiments of the invention are implemented.

FIG. 3 conceptually illustrates an electronic system 300 with which some embodiments of the invention are implemented. The electronic system 300 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only 320. For example, the various memory units include instructions for processing appearance alterations of displayable characters in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 2 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for testing PCIe devices, the method comprising:
    enabling an input/output (I/O) memory management unit (IOMMU);
    adding a peripheral component interconnect express (PCIe) device;
    creating by the IOMMU a domain, wherein the domain is a specified virtual memory address space for the device;
    allocating by the IOMMU the domain to the device, wherein the domain defines access-allowed memory address spaces of virtual memory for the device;
    mapping a physical memory address space to virtual address space, wherein the physical memory space is physical memory addresses for the device;
    monitoring direct memory access (DMA) for accesses by the device to memory space that are outside of the domain; and
    detecting a DMA memory address violation by the PCIe device.

2. The method of claim 1, wherein monitoring is repeated until intentionally stopped.

3. The method of claim 1, wherein the IOMMU includes the virtual memory address space and the physical memory address space.

4. The method of claim 2, wherein the IOMMU further comprises an address mapping function.

5. The method of claim 4, wherein the address mapping function maps a virtual address of a target device in the virtual memory address space to a physical address in the physical memory address space.

6. A non-transitory computer readable medium storing a kernel configuration module which, when executed by a processor of a computing device, tests PCie devices, the kernel configuration module comprising sets of instructions for:
enabling an input/output (I/O) memory management unit (IOMMU) of the computing device;
adding a peripheral component interconnect express (PCie) device;
creating by the IOMMU a domain, wherein the domain is a specified virtual memory address space for the device;
allocating by the IOMMU the domain to the device, wherein the domain defines access-allowed memory address spaces of virtual memory for the device;
mapping a physical memory address space to virtual address space, wherein the physical memory space is physical memory addresses for the device;
monitoring direct memory access (DMA) for accesses by the device to memory space that are outside of the domain; and
detecting a DMA memory address violation by a PCIe device.

7. The non-transitory computer readable medium of claim 6, wherein allocating a memory space domain comprises allocating a memory address fence in a virtual memory address space of the IOMMU.

8. The non-transitory computer readable medium of claim 7, wherein the IOMMU comprises the physical memory address space, an address mapping function, and the virtual memory address space.

9. The non-transitory computer readable medium of claim 8, wherein adding a memory address for the PCie device comprises a set of instructions for mapping a virtual address of the PCie device in the virtual memory address space to a physical address in the physical memory address space.

10. The non-transitory computer readable medium of claim 9, wherein mapping comprises a set of instructions for using the address mapping function in the IOMMU.

11. The method of claim 1, further comprising:
generating an error if access of a memory address outside of the domain is detected.

12. The method of claim 11, further comprising:
correlating the error with a device that is accessing the memory address outside of the domain.

13. The method of claim 1, further comprising:
displaying an error notification on a GUI if access of a memory address outside of the domain is detected.

14. The method of claim 1, further comprising:
testing the PCie device via a test system or application platform.

15. The non-transitory computer readable medium of claim 6, further comprising:
generating an error if access of a memory address outside of the domain is detected.

16. The non-transitory computer readable medium of claim 15, further comprising:
correlating the error with the PCie device that is accessing the memory address outside of the domain.

17. The non-transitory computer readable medium of claim 6, further comprising:
displaying an error notification on a GUI if access of a memory address outside of the domain is detected.

18. The non-transitory computer readable medium of claim 6, further comprising:
testing the PCie device via a test system or application platform.

19. A memory space violation detection system comprising:
one or more target test devices;
an I/O Memory Management Unit (IOMMU) connected to the one or more target test devices via an I/O bus connection, the IOMMU comprising:
a virtual memory address space that defines a memory address fence to limit memory access of the one or more target test devices to specified address spaces; and
a physical memory address space, mapped via an address mapping function, from the one or more specified address spaces accessed by the target test devices; and
a physical memory, connected to the IOMMU via a system memory bus, wherein the physical memory includes physical memory locations for data from the one or more target test devices;
a processor configured to:
monitor direct memory access (DMA) for accesses by the device to memory space outside of the memory address fence; and
detecting a DMA memory address violation by the device.

* * * * *